United States Patent [19]

Wagner et al.

[11] Patent Number: 5,004,398

[45] Date of Patent: Apr. 2, 1991

[54] BACKHOE MOUNTING DEVICE FOR A SKID STEER LOADER

[75] Inventors: Oryn B. Wagner, Bismarck; Terry J. Alm, Mandan, both of N. Dak.

[73] Assignee: Clark Equipment Company, South Bend, Ind.

[21] Appl. No.: 479,383

[22] Filed: Feb. 13, 1990

[51] Int. Cl.$^5$ .............................................. E02F 3/28
[52] U.S. Cl. .................................. 414/723; 172/273; 403/317; 414/786
[58] Field of Search .............. 414/686, 723, 920, 912, 414/786; 172/272, 273, 274, 275; 403/316, 317; 292/304, 223, 196, DIG. 49

[56] References Cited

U.S. PATENT DOCUMENTS

| | | | |
|---|---|---|---|
| 2,832,489 | 4/1958 | Bailey | 414/607 |
| 3,672,521 | 6/1972 | Bauer et al. | 214/145 |
| 3,732,996 | 5/1973 | Bauer et al. | 214/152 |
| 3,939,997 | 2/1976 | Frank | 414/686 |
| 3,984,016 | 10/1976 | Kuhn | 214/131 |
| 4,033,469 | 7/1977 | Frank | 414/686 |
| 4,117,944 | 10/1978 | Beckstrom et al. | 131/214 |
| 4,142,642 | 3/1979 | Myers | 414/719 |
| 4,150,504 | 4/1979 | Asche | 37/103 |
| 4,279,566 | 7/1981 | Sagaser et al. | 414/686 |
| 4,661,036 | 4/1987 | Horsch | 414/686 |
| 4,793,764 | 12/1988 | Hamon | 414/686 |

FOREIGN PATENT DOCUMENTS 1164323  2/1964  Fed. Rep. of Germany ...... 414/723

*Primary Examiner*—Robert J. Spar
*Assistant Examiner*—Donald W. Underwood
*Attorney, Agent, or Firm*—Kinney & Lange

[57] ABSTRACT

A mounting device for attaching an accessory apparatus to an off road vehicle. The mounting device includes a carrier frame mounted to the accessory and a mounting frame attached between the actuating arms of the off road vehicle. The mounting frame includes a bar member that is engageable with an overhanging member on the carrier frame to form a load bearing connection between the vehicle and the accessory apparatus. The mounting device further includes a pair of lug members secured to the carrier frame that are releasibly engageable with horizontally directed openings formed in hooks attached to opposite sides of the vehicle. Adjacent each of the lugs is mounted a movable over center locking mechanism that is movable between a locked position wherein the lugs are locked to the hooks to secure the accessory to the vehicle, and an unlocked position which allows the lugs to be removed from the openings in the hooks. Each of the over center locking mechanisms include a pivotable locking pawl engageable with the hook, an operating lever and a spring biased link which couples the pawl to the operating lever.

30 Claims, 8 Drawing Sheets

BACKHOE MOUNTING DEVICE FOR A SKID STEER LOADER

BACKGROUND OF THE INVENTION

This invention relates generally to connection devices for attaching an accessory apparatus to an off road vehicle. In particular, the present invention is a mounting device with an over center locking assembly for mounting a backhoe attachment to a skid steer loader.

Mounting devices for attaching implements to off road vehicles are in widespread use. U.S. Pat. No. 4,279,566 to Sagaser et al. discloses one such mounting device for attaching a backhoe attachment to a skid steer loader. The backhoe attachment is connected to the loader by a pair of spaced apart connection devices and an adaptor assembly. The adaptor assembly includes an elongate member extending between the boom arms of the loader. The elongate member is configured to engage in a wedge fit manner an overhanging member attached to a mounting frame of the backhoe attachment. The adaptor assembly connection provides a lower, load bearing connection between the mounting frame of the backhoe attachment and the loader, and allows the boom arms to lift the backhoe attachment to a position that permits actuation of the connection devices. The pair of spaced apart connection devices provide a stabilizing upper connection between the loader and backhoe attachment.

The connection devices include a pair of transverse, cylindrical bars attached to opposite sides of the main frame of the loader by anchor elements. A pair of spaced apart, U-shaped channel elements are secured to the backhoe attachment. The walls of the channel elements include downwardly disposed openings that are configured to engage opposite ends of the cylindrical bars when the backhoe attachment is lifted into position by the boom arms of the loader.

The channel elements include moveable sleeve members having wedge shaped openings that are adapted to engage the cylindrical bars and lock the bars within the downwardly disposed openings. The sleeve members are biased into this engaged position by spring elements disposed between the sleeve members and channel elements. The sleeve members are also releasibly engageable with projections on the channel elements that retain the sleeve members in positions spaced from the downwardly disposed openings to allow the channel elements to be disengaged from the bars.

It is evident that there is a continuing need for improved mounting devices for attaching implements to off road vehicles. In particular, there is a need for mounting devices which permit attachments to be quickly and securely mounted to off road vehicles. The mounting devices should also be convenient to use.

SUMMARY OF THE INVENTION

The present invention is a convenient-to-use mounting device for securely attaching an implement to a pair of spaced apart actuating arms on an off road vehicle. The mounting device includes a mounting frame secured to the actuating arms of the off road vehicle. The mounting frame is configured to engage a carrier frame secured to the implement. A hook assembly secured to the off road vehicle releasibly receives a lug assembly attached to the implement. When the lug assembly is engaged with the hook assembly, an over center locking assembly movably mounted on the implement releasibly locks the hook and lug assemblies together.

The mounting frame includes a bar member which engages an overhanging member secured to the carrier frame to provide a load bearing connection between the off road vehicle and the implement. This load bearing connection allows the actuating arms to lift the implement off the ground so as to engage the lug assembly with the hook assembly of the off road vehicle.

The hook assembly includes a pair of spaced hooks mounted on opposite sides of a main frame of the off road vehicle. Rear edges of the hooks include horizontally directed openings. The lug assembly includes a pair of spaced transverse lugs. Each lug includes a pin retained at its opposite ends in a pair of spaced transverse bushings mounted to the carrier frame. As the implement is lifted off the ground it is rotated rearwardly and then lowered and rotated forwardly so that the lugs pass over the hooks and then subsequently engage the horizontally directed openings of the hook assembly.

The over center locking assembly includes a pair of over center locking mechanisms mounted adjacent to the lugs. Each of the over center locking mechanisms is movable between an unlocked position which permits the lugs to be readily disengaged from the hooks, and a locked position wherein the lugs are locked within the horizontally directed hook openings. Included in each of the over center locking mechanisms is a pivotable pawl that is coupled to a pivotable operating lever by a spring biased link. Front edges of the hooks include notches that are configured to receive the pawls when the over center locking mechanisms are in their locked positions.

This mounting device is relatively uncomplicated and is convenient to use. It allows an implement to be quickly and securely attached to an off road vehicle.

DETAILED DESCRIPTION OF THE PREFERRED EMBODIMENTS

Figure 1:
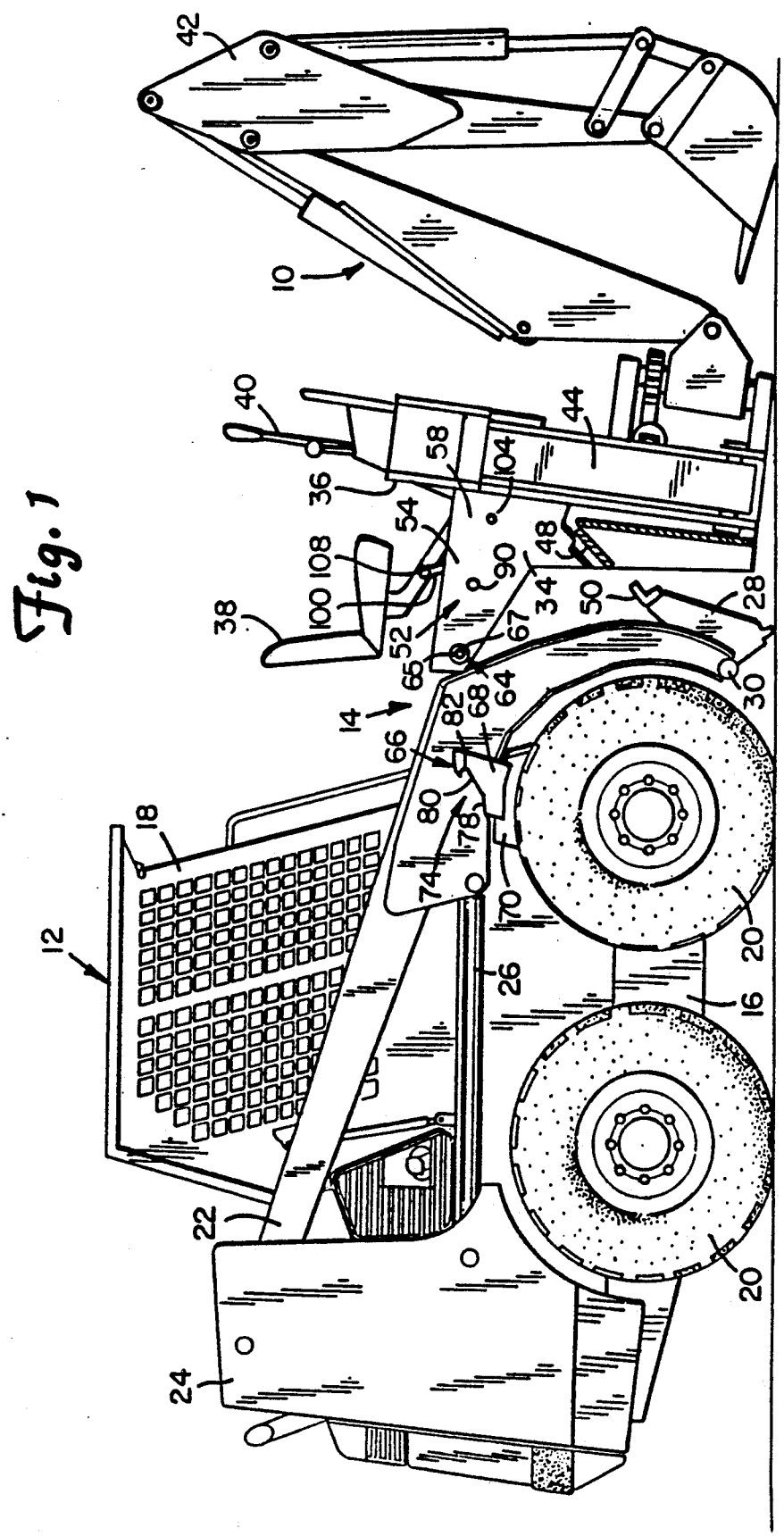
FIG. 1 is a side elevational view of a skid steer loader and a detached backhoe attachment which shows components of the mounting device of the present invention.
Figure 2:
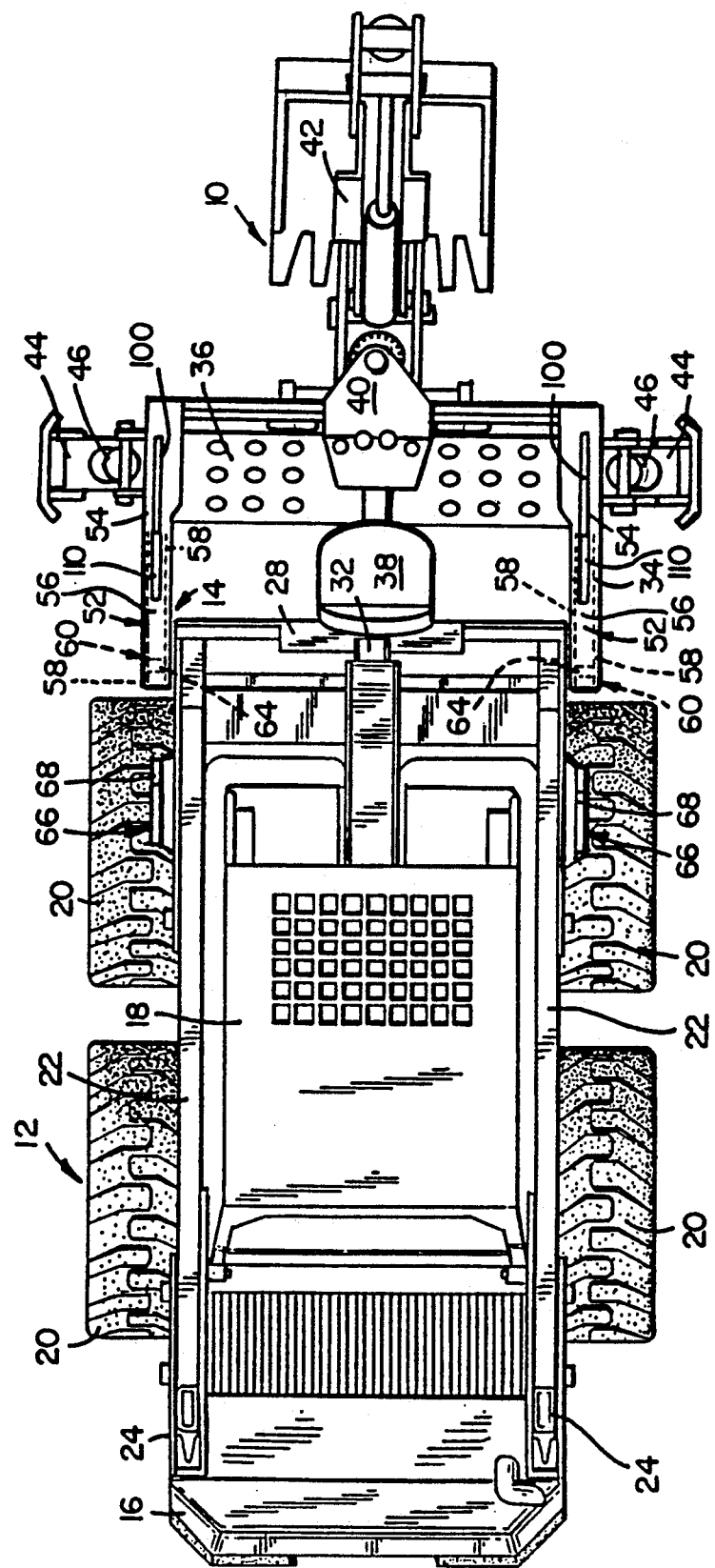
FIG. 2 is a top elevational view of the backhoe attachment secured to the loader by the mounting device shown in FIG. 1.

A mounting device 14 in accordance with the present invention is illustrated generally in FIGS. 1 and 2. Mounting device 14 is used to secure accessories such as backhoe attachment 10 to off road vehicles such as skid steer loader 12. Mounting device 14 is illustrated in greater detail in FIGS. 3–8 and described in subsequent portions of this specification. However, a complete understanding of the mounting device 14 will be facilitated by the following general description of the loader 12 and backhoe attachment 10.

As shown in FIGS. and 21, the loader 12 includes a main frame 16 and an operator's cab 18. Loader 12 is supported for over the ground travel by wheels 20 rotatably mounted to frame 16. Motive force for the wheels 20 is provided by a hydrostatic drive system (not shown) mounted to the main frame 16 and controlled by an operating unit (not shown) mounted within the cab 18.

A pair of spaced actuating arms or lift arms 22 are pivotally mounted at their first ends to upright supports 24. Hydraulic lift cylinders 26 (only one being visible in FIG. 1) raise and lower the lift arms 22 with respect to the main frame 16 in a known manner. A mounting frame 28 is pivotally connected by pivot mechanism 30 (see FIG. 1) to second ends of the lift arms 22. The mounting frame 28 is rotated with respect to the lift arms 22 in a known manner by a tilt cylinder 32 (see FIG. 2).

As seen in FIGS. and 2, the backhoe attachment 10 includes a carrier frame 34 and an operator's compartment 36. The operator's compartment 36 includes an operator's chair 38 and controls 40 for manipulating a conventional backhoe 42 in a known manner. The backhoe attachment 10 further includes a pair of stabilizing elements such as pivotable outriggers 44 that extend transversely from opposite sides of the carrier frame 34. The outriggers 44 are raised and lowered in a known manner by hydraulic cylinders 46 (see FIG. 2). The outriggers 44 are lowered to engage the ground and provide laterally support to the backhoe attachment 10 when digging with the backhoe 42. The stabilizing elements can also take the form of vertical outriggers (not shown) which would extend vertically from opposite sides of the backhoe attachment 10.

As seen in FIG. 1, the carrier frame 34 includes an overhanging member 48 extending along an intermediate portion thereof. Overhanging member 48 is configured to receive an elongate bar member 50 extending across a top edge of the mounting frame 28. As seen in FIGS. 3–7, the bar member 50 engages the overhanging member 48 in a wedge fit manner to provide a load bearing connection between the backhoe attachment 10 and loader 12. The carrier frame 34 is securely locked to the mounting frame 28 by a quick attachment device such as disclosed in the U.S. Pat. No. 3,672,521 to Bauer et al. This load bearing connection allows the lift cylinders 26 to raise the attachment 10 off the ground and permits the tilt cylinder 32 to be actuated to rotate the attachment 10 relative to the lift arms 22.

As seen in FIG. 2, the carrier frame 34 further includes a pair of spaced stabilizing arms 52 that extend rearwardly toward the loader 12 from opposite sides of the carrier frame 34. Each stabilizing arm 52 includes a downwardly opening, substantially U-shaped channel member 54 that includes an upper base portion 56 and a pair of downwardly extending side walls 58. The channel members 54 house a lug assembly 60 and an over center locking assembly 62 that form part of the mounting device 14.

Figure 5:
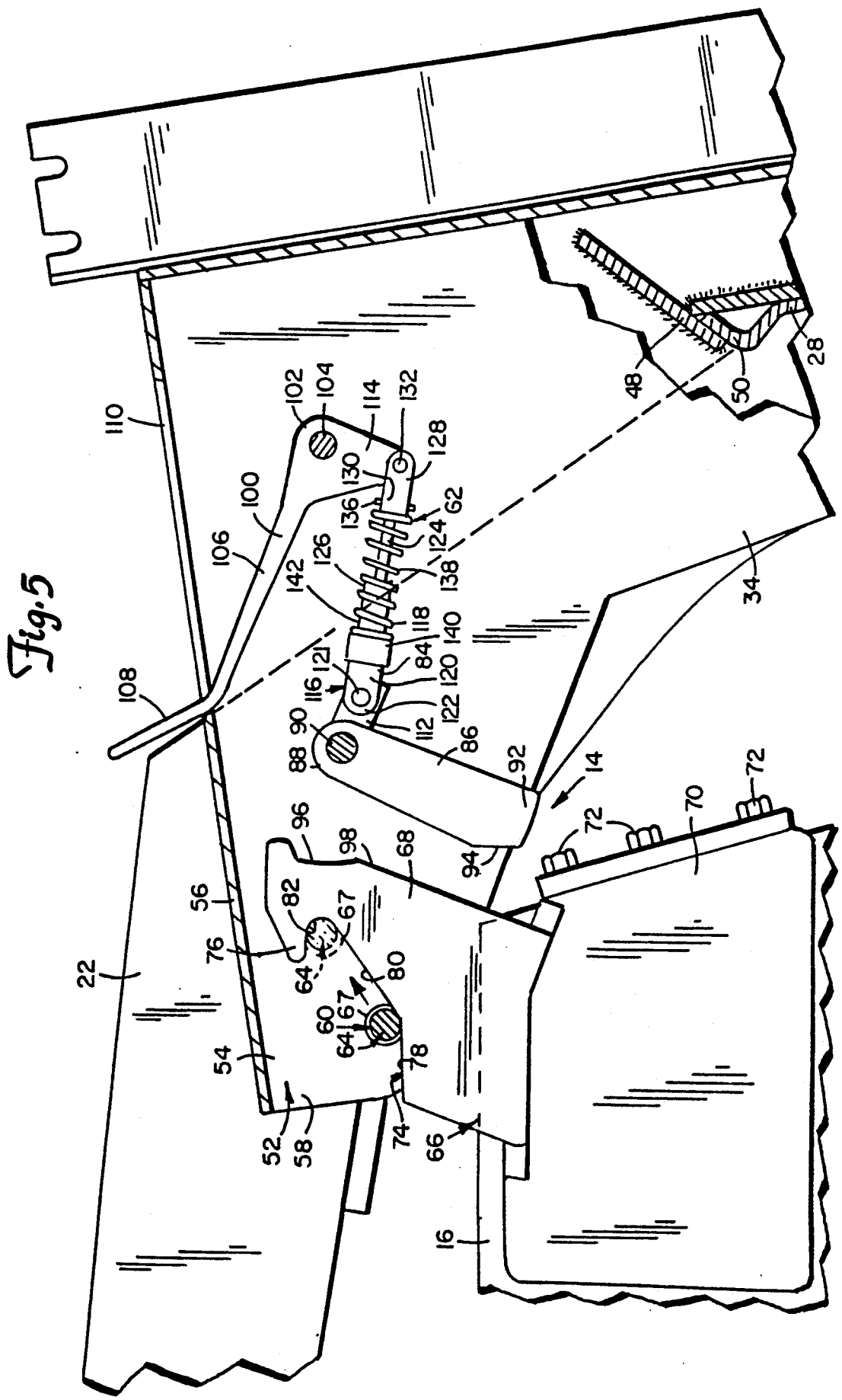
FIG. 5 is a side elevational view similar to FIG. 3 showing the lug engaged with the limiting surface of the hook opening in solid lines, and the lug engaged with the terminal portion of the hook opening in phantom lines.
Figure 6:
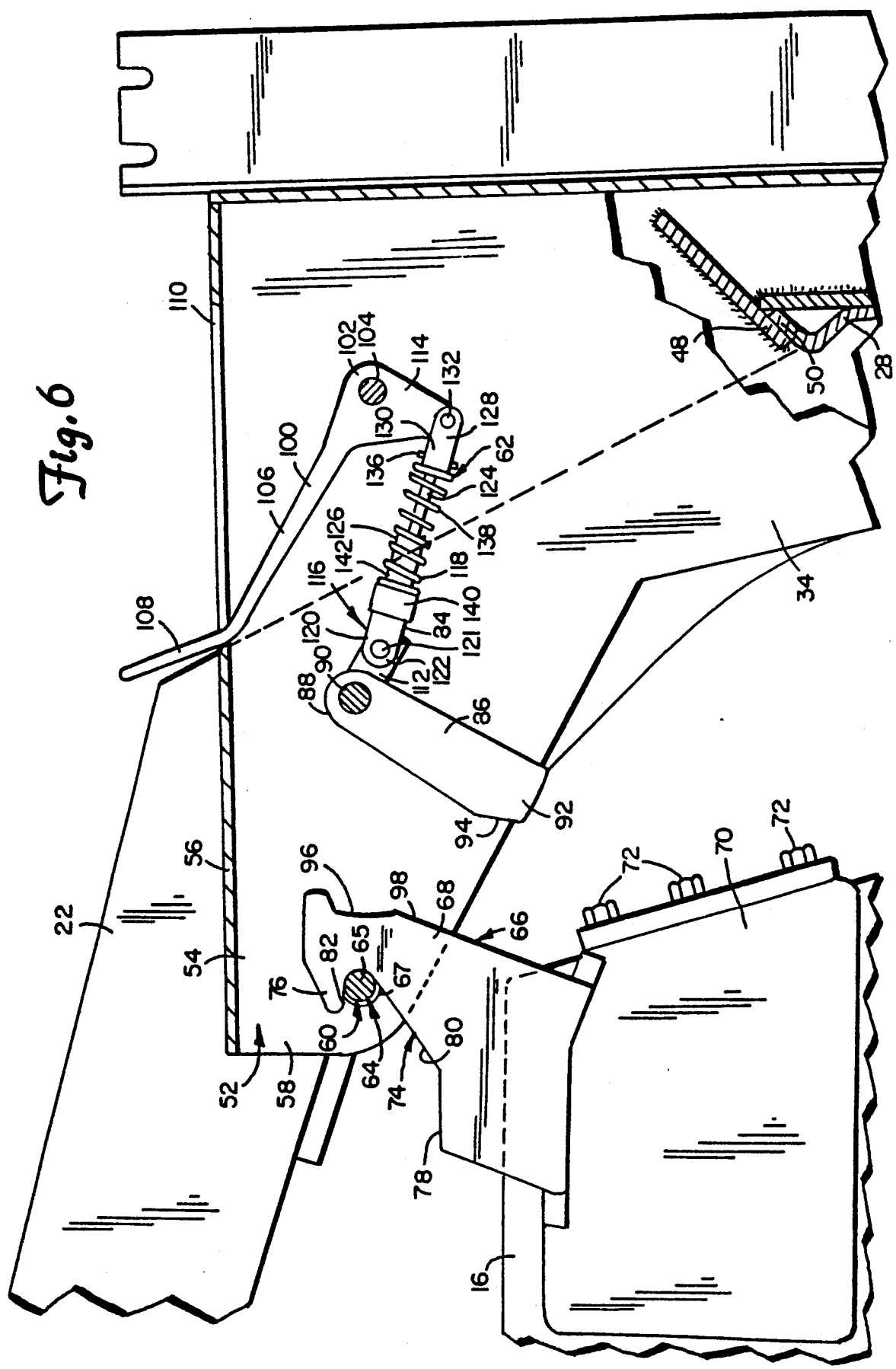
FIG. 6 is a side elevational view similar to FIG. 3 showing the lug engaged with the terminal portion of the horizontally directed hook opening.
Figure 7:
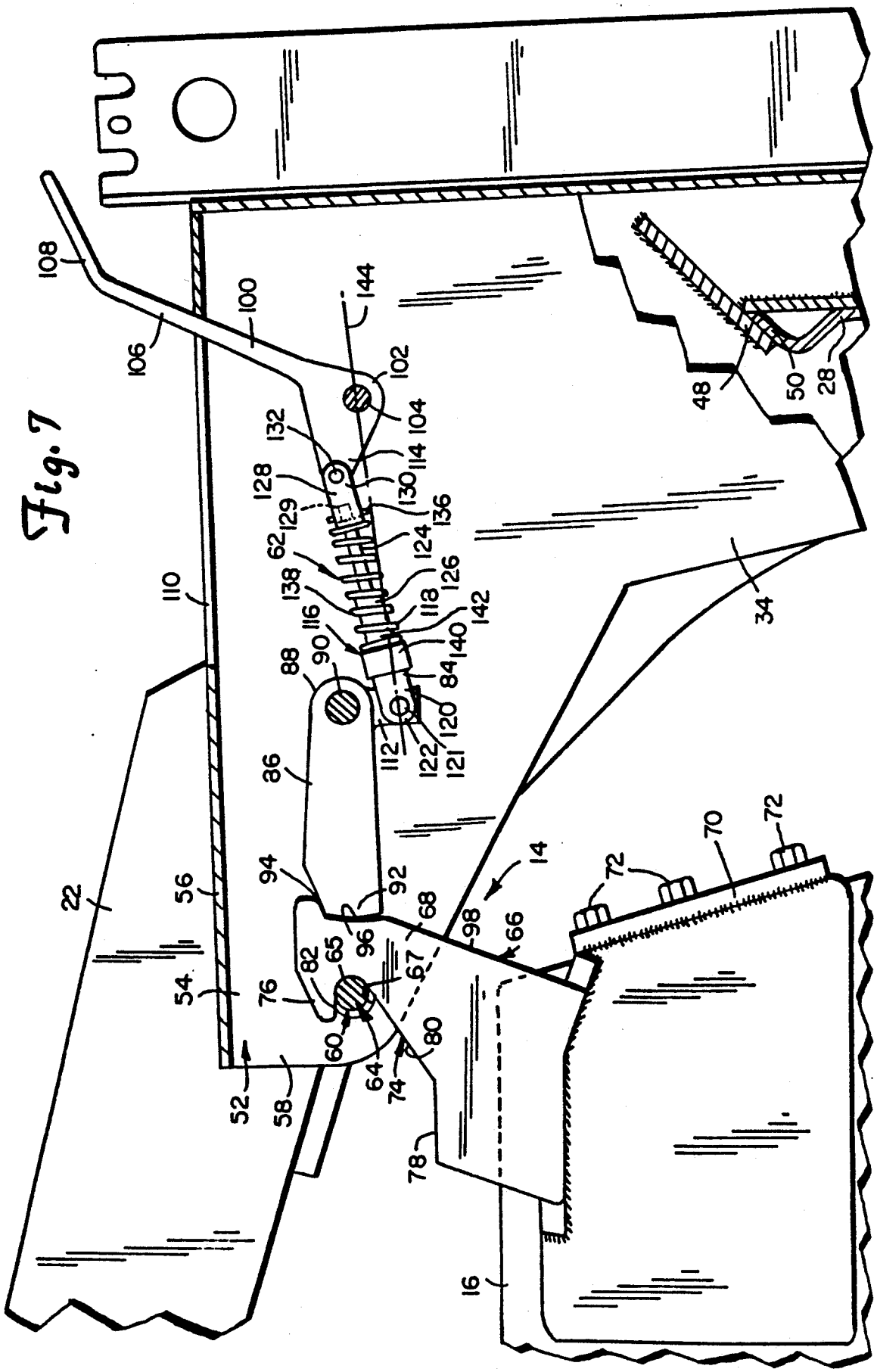
FIG. 7 is a side elevational view similar to FIG. 5 with the over center locking mechanism shown in the locked position.

The lug assembly 60 includes a pair of lugs 64, each of which extends transversely between both of the side walls 58 of the channel members 54. Each of the lugs 64 is a pin 65 whose opposite ends are retained by bushings 67 mounted in the side walls 58. As seen in FIGS. 5–7 the lug assembly 60 is adapted to releasibly engage a hook assembly 66 mounted on the main frame 16 of the loader 12. As seen in FIG. 2, the hook assembly 66 includes a pair of hooks 68 mounted to opposite sides of the main frame 16. The channel members 54 are configured to ride over the hooks 68 so that the hooks 68 are received between the side walls 58 and below base portions 56. The hooks 68 are mirror images of one another, hence, only the hook 68 attached to the right side of the frame 16 as shown in FIGS. 3–7 will be described with particularity. The hook 68 on the left side can be otherwise identical. Hook 68 includes an anchor element 70 which is secured to the main frame 16 of the loader 12 by fasteners such as bolts 72 or by welding. A horizontally directed opening 74 is formed in a rear edge 76 of the hook 68 and includes a limiting surface 78, an inclined guide surface 80 and a terminal portion 82.

The over center locking assembly 62 includes a pair of over center locking mechanisms 84, one of which is housed within each of the channel members 54 of the stabilizing arms 52. Each over center locking mechanism 84 is movable between a locked position, wherein the lug 64 is secured in the terminal portion 82 of the associated hook 68, and an unlocked position, wherein the lug 64 can be readily disengaged from the horizontally directed opening 74 of the hook 68. The over center locking mechanisms 84 are mirror images of one another so only the right side locking mechanism as shown in FIGS. 3–8 will be described with particularity. The locking mechanism 84 on the left side can be otherwise identical. Locking mechanism 84 includes a locking pawl 86 pivotally attached at a first end 88 between the side walls 58 by a first pivot mount 90. A second end 92 of the pawl 86 includes a tapered lock portion 94 that is configured to engage a notch 96 formed in a front edge 98 of the hook 68 when the locking mechanism 84 is in the locked position.

The locking mechanism 84 further includes a generally L-shaped operating lever 100 pivotally attached at a first end 102 to the side walls 58 of the channel member 54 by a second pivot mount 104. The L-shaped operating lever includes a long first portion 106 and a shorter second portion 108 extending at an angle relative to the first portion 106. As seen in FIGS. 1 and 3–7, the operating lever 100 extends through an elongated opening 110 formed in the base portion 56 of the channel member 54. As seen in FIGS. 3–6, when the locking mechanism 84 is in the unlocked position the second portion 108 is oriented substantially vertical as it extends through the opening 110. When the locking mechanism 84 is in the locked position as shown in FIG. 7, a segment of the long first portion 106 is visible above the base portion 56 and the second portion 108 is oriented substantially parallel to the base portion 56 to indicate the locked position of the locking pawl 86.

Figure 8:
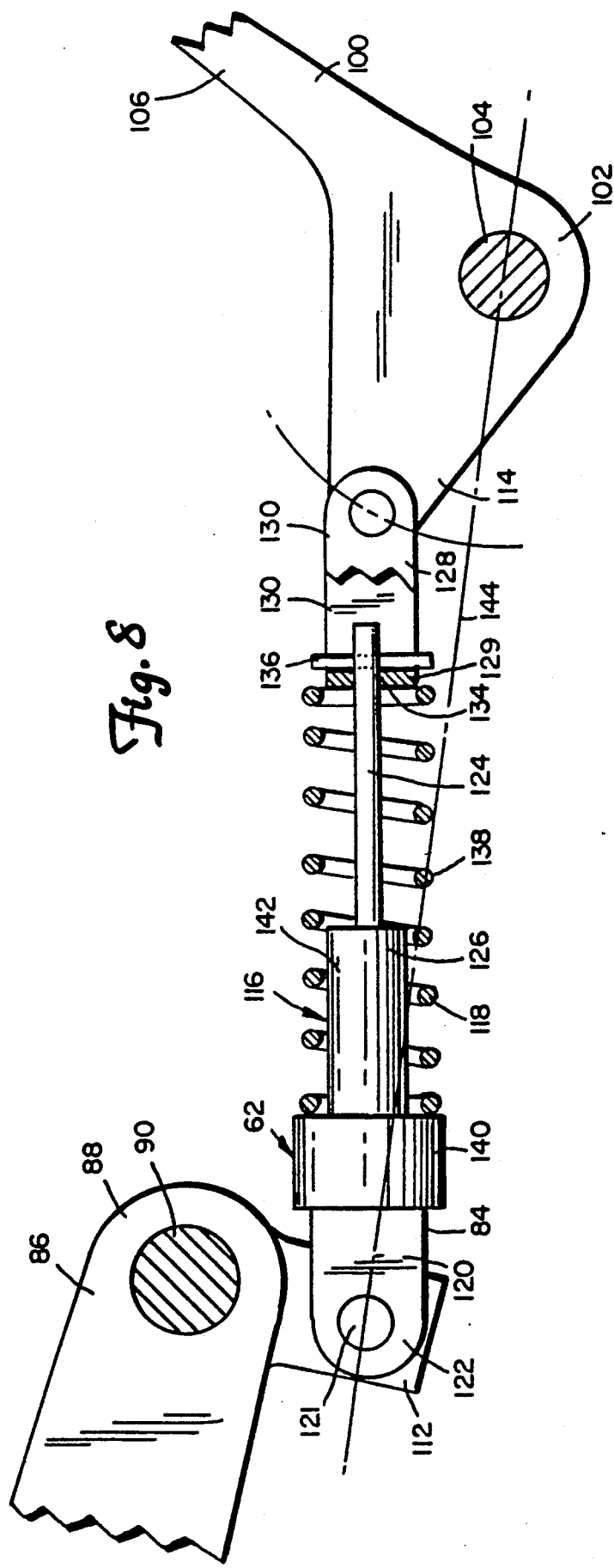
FIG. 8 is an enlarged side elevational view partially in section with portions broken away which shows components of the spring biased link of the over center locking mechanism.

The locking pawl 86 further includes a perpendicular extension 112 extending outwardly from the first end 88. The operating lever 100 further includes a projection 114 adjacent the second pivot mount 104. An over center linkage 116 extends between the locking pawl 86 and the operating lever 100. The over center linkage 116 includes a spring biased link 118. As seen in FIG. 8, the spring biased link 118 is defined by a chuck 120 pivotally attached by a pivot element 121 at a first end 122 to the perpendicular extension 112 of the locking pawl 86. A rod 124 is rigidly secured to a second end 126 of the chuck 120.

A U-shaped clevis 128 includes a bight portion 129 and a pair of outwardly extending arms 130 (see FIG. 8). The arms 130 of the clevis 128 are pivotally attached by a pivot element 132 to the projection 114 of the operating lever 100. The bight portion 129 of the clevis 128 includes an opening 134 (see FIG. 8) configured to slidably receive the rod 124. A stop pin 136 mounted transverse to the longitudinal extent of the rod 124 contacts the bight portion 129 to limit the extent to which the rod 124 can slide relative to the clevis 128.

A compression spring 138 extends between an enlarged portion 140 of the chuck 120 and the bight portion 129 of the clevis 128. The spring 138 biases the clevis 128 away from the chuck 120. The chuck 120 further includes a bearing element 142 that acts as a centering guide for the compression spring 138 to align the spring 138 along the longitudinal extent of the rod 124.

Figure 3:
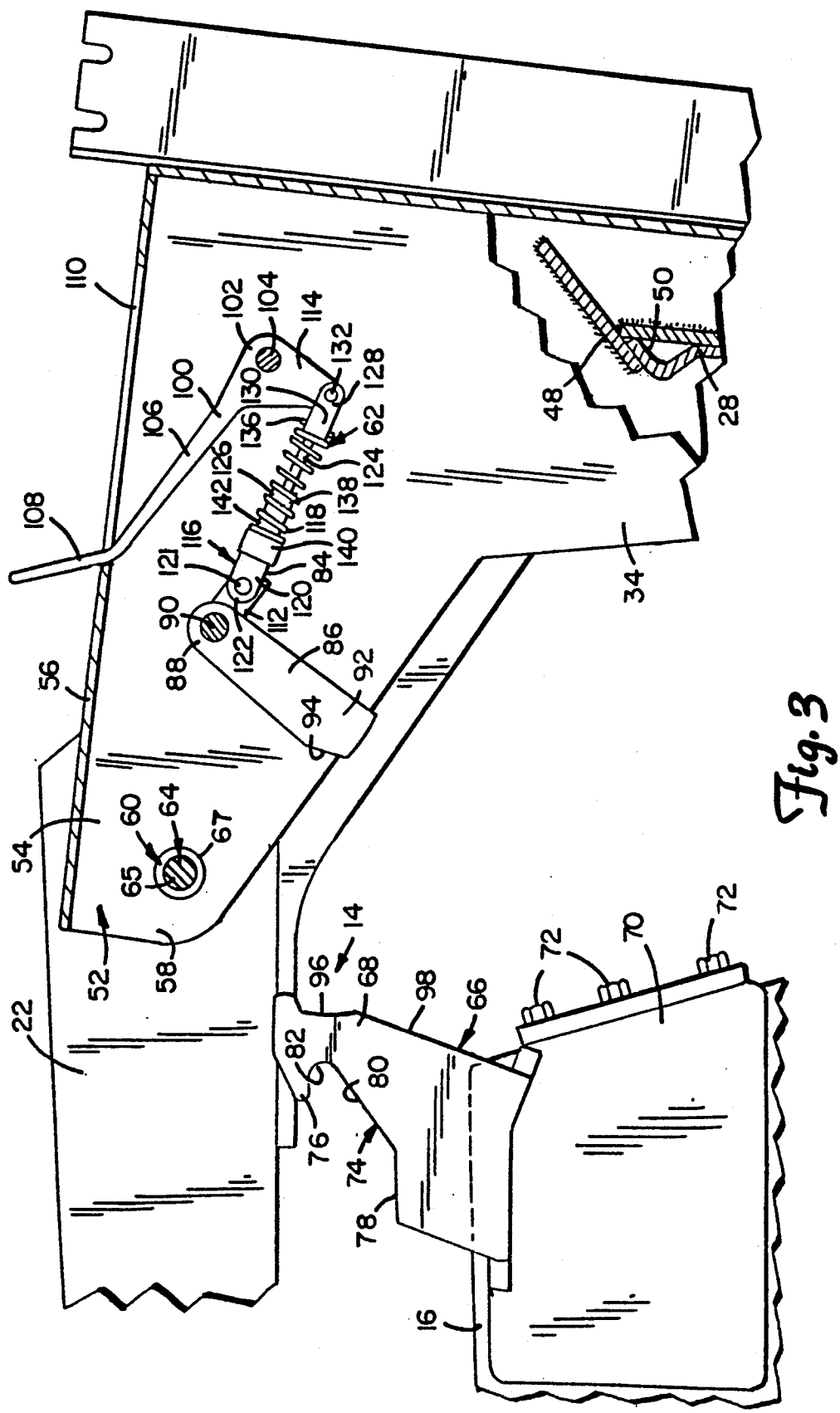
FIG. 3 is a side elevational view of one side of the mounting device partially in section with portions broken away showing the mounting frame engaged with the carrier frame and the lug elevated above the hook.

In operation, as shown in FIG. 1, the backhoe attachment 10 is supported on a ground surface. The skid steer loader 12 is positioned so that the mounting frame 28 is closely adjacent the carrier frame 34 of the backhoe attachment 10. The tilt cylinder 32 is then extended to rotate the mounting frame 28 away from the main frame 16 so that the bar member 50 is in position to engage the overhanging member 48 of the carrier frame 34. From this position, the lift cylinders 26 are extended to raise the lift arms 22 and engage the bar member 50 with the overhanging member 48, thereby forming the load bearing connection as seen in FIG. 3. The carrier frame 34 is securely locked to the mounting frame 28 by a quick attachment device such as disclosed in the U.S. Pat. No. 3,672,521 to Bauer et al.

Figure 4:
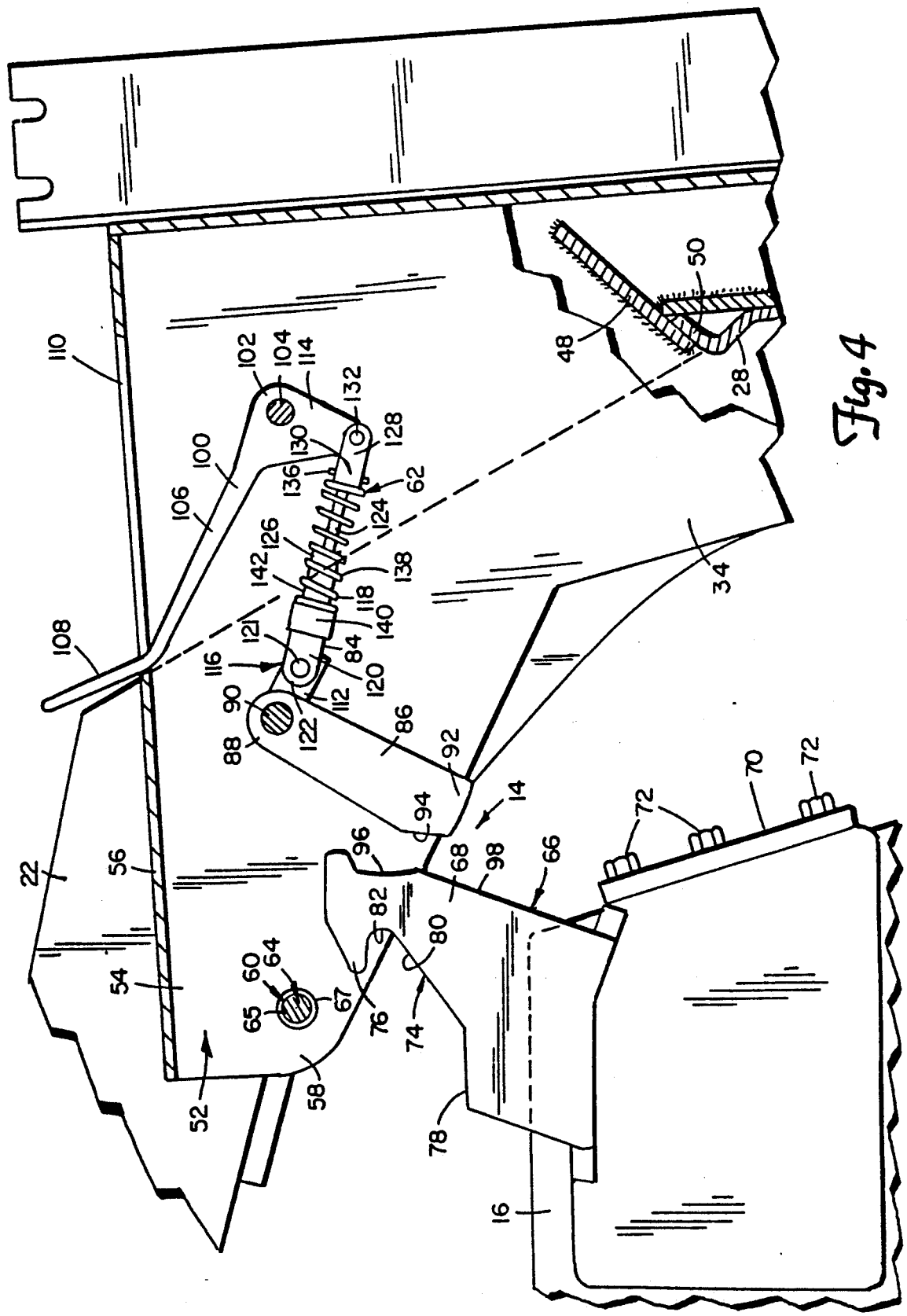
FIG. 4 is a side elevational view similar to FIG. 3 showing the lug above the horizontally directed opening of the hook.

As seen in FIG. 4, the lift arms 22 are raised and the mounting frame 28 is tilted rearwardly toward the operator's cab 18 by retracting the tilt cylinder 32 so as to bring the lugs 64 up and over the hooks 68. Retraction of the hydraulic lift cylinders 26 lowers the backhoe attachment 10 until the lugs 64 engage the limiting surfaces 78 of the horizontally directed openings 74 of the hooks 68 as shown in FIG. 5. The limiting surfaces 78 act as stops to indicate that the lugs 64 have made contact with the hooks 68. At this time, the tilt cylinder 32 is once again extended to pivot the mounting frame 28 away from the operator's cab 18 so that the lugs 64 ride up the guide surfaces 80 and engage the terminal portions 82 of the horizontally directed openings 74 in the hooks 68 as seen in FIG. 6.

As seen in FIG. 7, the operating levers 100 of the over center locking mechanisms 84 are pivoted about the second pivot mounts 104, thereby moving the locking pawls 86 from the unlocked position to the locked position wherein the tapered locked portions 94 are engaged with the notches 96 in the front edges 98 of the hooks 68. During this movement, the compression spring 138 of the spring biased link 118 is compressed to a point where the longitudinal extent of the rod 124 is parallel to a line 144 (see FIGS. 7 and 8) drawn from the pivot element 121 to the second pivot mount 104. Further movement of the operating lever 100 in the same direction results in an over center action which allows the spring 138 to expand again and thereby secure the locking pawl 86 in the locked position.

To remove the backhoe attachment 10 from the skid steer loader 12 the over center locking mechanisms 84 are returned to their unlocked positions. The tilt cylinder 32 is retracted rotating the mounting frame 28 back toward the operator's cab 18 which removes the lugs 64 from the terminal portions 82 of the hooks 68. The lift cylinders 26 are again extended to lift the lugs 64 above the hooks 68 and the tilt cylinder 32 is extended rotating the mounting frame 28 to return the carrier frame 34 to the position shown in FIG. 3. The lift cylinders 26 are then retracted to lower the backhoe attachment 10 back to the ground and the mounting frame 28 is removed from engagement with the overhanging member 48 of the carrier frame 34.

Although the present invention has been described with reference to preferred embodiments, workers skilled in the art will recognize that changes may be made in form and detail without departing from the spirit and scope of the invention.

What is claimed is:

1. A mounting device for attaching an implement to a pair of spaced actuating arms on an off road vehicle, comprising:
   a carrier frame mounted to the implement;
   a mounting frame secured to the arms for engaging the carrier frame;
   a lug assembly secured to the implement;
   a hook assembly secured to the vehicle for releasibly receiving the lug assembly; and
   an over center locking assembly movably mounted on the implement for releasibly locking the lug assembly to the hook assembly.

2. The device of claim wherein the hook assembly includes a horizontally extending opening on a rear edge thereof.

3. The device of claim 2 wherein the opening includes:
   a limiting surface;
   a terminal portion; and
   an inclined guide surface extending between the limiting surface and the terminal portion for directing the lug assembly into the terminal portion.

4. The device of claim 2 wherein the locking assembly includes an over center locking mechanism, including:
   a pivotable pawl for engaging the hook assembly;
   a pivotable operating lever; and an over center linkage coupling the lever to the pawl for moving the pawl into and out of engagement with the hook assembly.

5. The device of claim 4 wherein the hook assembly further includes a notch opposite the horizontal opening for receiving the pawl.

6. The device of claim 5 wherein the over center linkage includes a spring biased link pivotally connected to the pawl and operating lever.

7. The device of claim 6 wherein the spring biased link includes:
   a clevis pivotally attached to the operating lever;
   a rod pivotally attached to the locking pawl and slidably received in the clevis; and
   a compression spring disposed between the rod and clevis for biasing the pawl into engagement with the hook assembly in a first lever position and out of engagement with the hook assembly in a second lever position.

8. The device of claim 7 wherein: the hook assembly includes a pair of spaced hooks;
the lug assembly includes a pair of spaced lugs; and
the over center locking assembly includes a pair of spaced over center locking mechanisms.

9. The device of claim 8 wherein each lug includes a pin having opposite ends retained in bushings mounted to the carrier frame.

10. The device of claim 7 wherein the rod further includes a stop pin for limiting the extent the clevis can slide relative to the rod.

11. An off road vehicle comprising:
a main frame;
lift arms pivoted on the frame;
a lift cylinder connected between the frame and lift arms for raising and lowering the arms;
an accessory mounting frame pivotally attached to the lift arms;
a tilt cylinder connected between the lift arms and mounting frame for pivoting the mounting frame relative to the lift arms;
an accessory apparatus including a carrier frame for attachment to the mounting frame;
a lug assembly mounted on a rear side of the apparatus;
a hook assembly mounted on the main frame for releasibly receiving the lug assembly; and
an over center locking assembly connected to one of the accessory apparatus or vehicle, and being movable between an unlocked position permitting the lug assembly to be removed from the hook assembly, and an over center locked position locking the lug assembly in the hook assembly.

12. The vehicle of claim 11 wherein the hook assembly includes an opening directed towards the rear of the vehicle away from the apparatus.

13. The vehicle of claim 12 wherein the lug assembly includes a lug engageable with the opening of the hook assembly.

14. The vehicle of claim 13 wherein the locking assembly includes an over center locking mechanism mounted on the apparatus, including:
a moveable locking pawl for engaging the hook assembly;
a moveable operating lever; and
an over center linkage coupling the operating lever to the locking pawl.

15. The vehicle of claim 14 wherein the hook assembly includes a locking notch opposite the opening for selectively receiving the pawl.

16. The vehicle of claim 15 wherein the accessory apparatus further includes a channel for housing the locking mechanism.

17. The vehicle of claim 16 wherein the accessory apparatus further includes first and second spaced pivot axes within the channel for pivotally mounting the pawl and operating lever, respectively.

18. The vehicle of claim 16 wherein the over center linkage further includes a spring biased link pivotally connected to the pawl and operating lever.

19. The vehicle of claim 18 wherein the spring biased link includes:
a clevis pivotally attached to the operating lever;
a chuck pivotally attached to the locking pawl;
a rod rigidly attached to the chuck and slidably received in the clevis; and
a compression spring disposed between the clevis and chuck to bias the clevis out of engagement with the chuck.

20. The vehicle of claim 19 wherein the rod further includes a stop pin mounted transverse to the longitudinal extent of the rod for limiting the extent the clevis can slide relative to the chuck.

21. The vehicle of claim 19 wherein the operating lever includes a first portion and a second portion angled relative to the first portion, the second portion when generally vertically oriented indicating the unlocked position of the locking mechanism and when generally horizontally oriented indicating the locked position of the locking mechanism.

22. The vehicle of claim 12 wherein the hook assembly includes an anchor element for attaching the hook assembly to the main frame.

23. The vehicle of claim 19 wherein the accessory apparatus comprises a backhoe attachment.

24. The vehicle of claim 19 wherein the off road vehicle comprises a skid steer loader.

25. The vehicle of claim 19 wherein:
the carrier frame includes an overhanging member; and
the mounting frame includes a bar member at the top thereof which is adapted to engage the overhanging member for providing a load bearing connection between the accessory apparatus and vehicle.

26. The vehicle of claim 21 wherein:
the hook assembly includes a pair of spaced hooks;
the lug assembly includes a pair of spaced lugs; and
the over center locking assembly includes a pair of spaced over center locking mechanisms.

27. For use with an off road vehicle having a main frame with lift arms pivotally mounted thereto, a lift cylinder connected between the main frame and lift arms for raising and lowering the lift arms relative to the main frame, a mounting frame pivotally attached to the lift arms, a tilt cylinder connected between the lift arms and mounting frame for pivoting the mounting frame relative to the lift arms, a hook assembly mounted to the main frame and having a horizontally directed opening on a rear side thereof and configured to receive a implement having a carrier frame, a lug assembly and a locking assembly pivotally mounted adjacent to the lug assembly; a method for attaching the implement to the vehicle, including:
supporting the implement on the ground;
moving the vehicle to a position next to the implement with the mounting frame of the vehicle adjacent the carrier frame of the implement;
actuating the tilt cylinder in a first direction to rotate the mounting frame with respect to the lift arms;
engaging the mounting frame of the vehicle with the carrier frame of the implement;
actuating the lift cylinder in a first direction to rotate the lift arms with respect to the main frame to raise the lug assembly of the implement above the hook assembly;
actuating the tilt cylinder in a second direction to pivot the lug assembly of the implement to the rear side of the hook assembly;
actuating the lift cylinder in a second direction to rotate the lift arms relative to the main frame to lower the lug assembly of the implement into contact with the hook assembly;

actuating the tilt cylinder in the first direction to position the lug assembly of the implement in the opening of the hook assembly; and pivoting the locking assembly in a first direction into engagement with a front side of the hook assembly to trap the hook assembly between the lug assembly and locking assembly and thereby securely fasten the implement to the vehicle.

28. The method of claim 27 wherein:

the locking assembly further includes a pivotable locking pawl for engaging the front side of the hook assembly, a pivotable operating lever and an over center linkage coupling the lever to the pawl; and pivoting the lock assembly in the first direction includes rotating the operating lever from an unlocked position to an over center locked position.

29. The method of claim 28 and further including a method for removing the implement from the vehicle, including:

pivoting the locking assembly in a second direction out of engagement with the front side of the hook assembly to release the hook assembly from between the lug assembly and locking assembly;

actuating the tilt cylinder in the second direction to remove the lug assembly from the opening in the hook assembly;

actuating the lift cylinder in the first direction to rotate the lift arms relative to the main frame to raise the lug assembly above the hook assembly;

actuating the tilt cylinder in the first direction to pivot the lug assembly to the front side of the hook assembly;

actuating the lift cylinder in the second direction to rotate the lift arms relative to the main frame to lower the implement to the ground;

disengaging the mounting frame from the carrier frame;

actuating the tilt cylinder in the second direction to rotate the mounting frame relative to the lift arms; and moving the vehicle away from the implement.

30. The method of claim 29 wherein:

pivoting the locking assembly in the second direction includes rotating the operating lever from the over center locked position to the unlocked position.

* * * * *

UNITED STATES PATENT AND TRADEMARK OFFICE
CERTIFICATE OF CORRECTION

PATENT NO. : 5,004,398

DATED : April 2, 1991

INVENTOR(S) : Oryn B. Wagner et al.

It is certified that error appears in the above-identified patent and that said Letters Patent is hereby corrected as shown below:

Col. 6, line 37, delete "claim", insert --claim 1--.

Signed and Sealed this

Twenty-second Day of December, 1992

Attest:

DOUGLAS B. COMER

*Attesting Officer*    *Acting Commissioner of Patents and Trademarks*